UNITED STATES PATENT OFFICE.

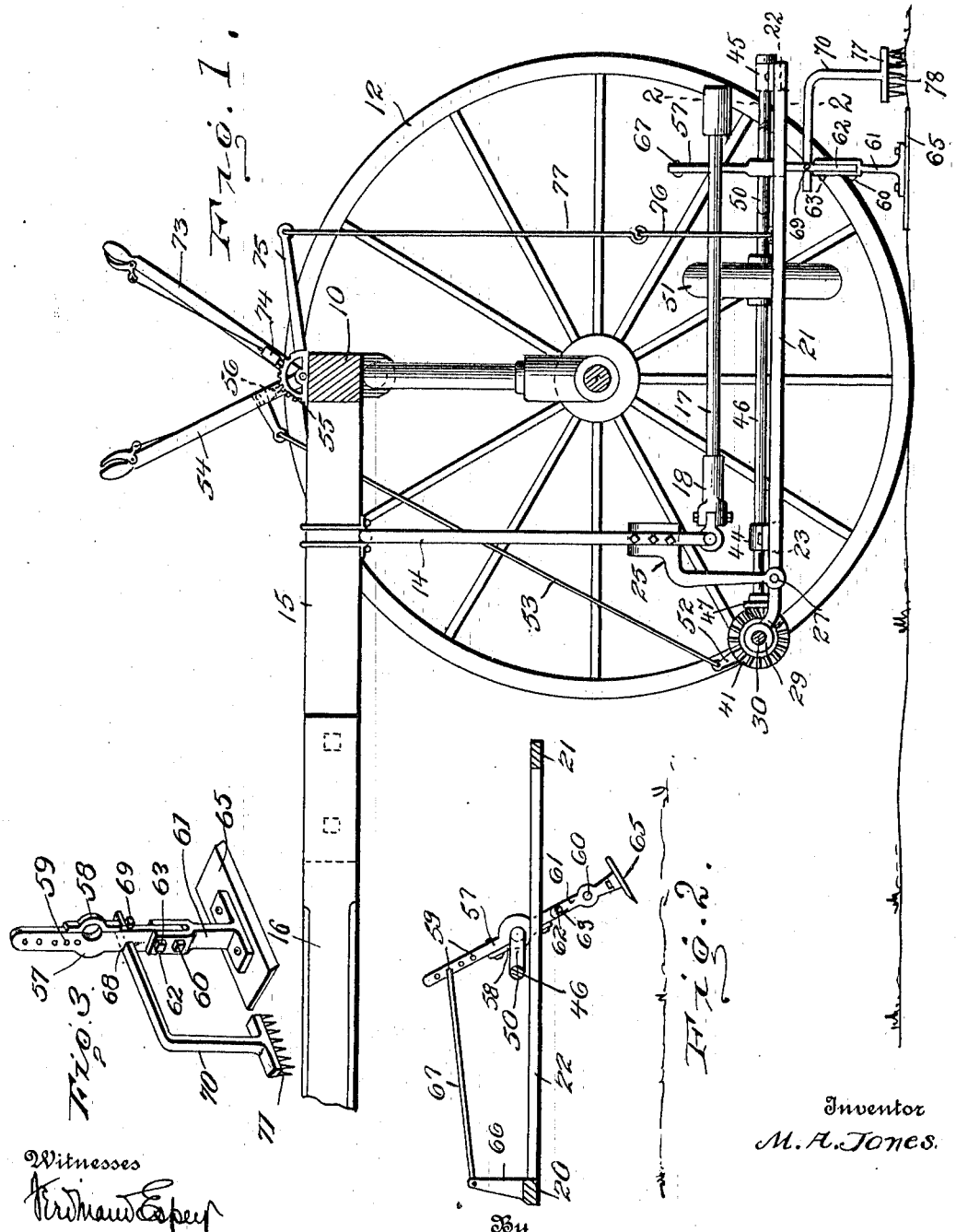

MARTIN A. JONES, OF OGLESBY, TEXAS.

COTTON-CHOPPER.

1,059,470.  Specification of Letters Patent.  Patented Apr. 22, 1913.

Application filed October 3, 1911. Serial No. 652,600.

*To all whom it may concern:*

Be it known that I, MARTIN A. JONES, citizen of the United States, residing at Oglesby, in the county of Coryell and State of Texas, have invented certain new and useful Improvements in Cotton-Choppers, of which the following is a specification.

This invention relates to improvements in cotton choppers, more particularly to devices of this character adapted to be connected to other machines such as a cultivator or the like, and has for one of its objects to simplify and improve the construction and increase the efficiency and utility of devices of this character.

Another object of the invention is to provide a device of this character adapted to be detachably coupled to a cultivator or like implement in position to operate without interfering with the ordinary operations of the cultivator, or so that the chopping action and cultivator action may be conducted simultaneously.

With these and other objects in view, the invention consists in certain novel features of construction as hereafter shown and described, and then specifically pointed out in the claims, and in the drawings illustrative of the preferred embodiment of the invention, Figure 1 is a side elevation partly in section of the improved device mounted upon a conventional cultivator frame. Fig. 2 is a section on the line 2—2 of Fig. 1, looking in the direction of the arrow. Fig. 3 is an enlarged and detached perspective view of the chopper device.

Corresponding and like parts are referred to in the following description and indicated in all the views of the accompanying drawings by the same reference characters.

The improved apparatus may be applied without material structural changes to the various forms of cultivators in use and for the purpose of illustration is shown applied to a conventional cultivator including an elevated axle mechanism 10 having the usual bearing wheels one of which is shown at 12, an arched frame 14 in advance of the axle frame and coupled rigidly thereto and likewise to the supporting members 15 of the tongue 16. The cultivator beams 17 are connected to the arched frame 14 as shown at 18, and the beams will have the usual hoes not shown.

Extending beneath the members 10—14 is an oblong frame comprising side members 20—21, a rear member 22, and a front member 23. Brackets one of which is shown at 25 are rigidly connected to the vertical portions of the arched supporting frame 14 and pivoted at 26—27 to the frame members 20—21, whereby the oblong frame is swingingly connected to the arched supporting frame. The side members 20—21 of the frame extend forwardly of the transverse member 23 and terminate in bearings 28—29 through which a shaft 30 is mounted for rotation.

Mounted for rotation in bearings 44—45, is a shaft 46, and connected to the shaft, is a bevel pinion 47 engaging with a bevel gear 41 on the shaft 30. The shaft 46 is provided with stop collars 48—49 which limit its longitudinal movement, and the shaft is likewise provided with a crank 50 and a balance wheel 51.

Mounted to swing upon the crank 50 is a standard or bar 57 which is coupled to the crank by a cap 58 and provided at one end with a plurality of apertures 59 spaced apart. Pivoted at 60 to the opposite end of the bar 57, is a standard member 61 forked at one end to bear upon opposite sides of the member 57 and with notches 62 near the ends of the forked portion to engage over a bolt 63 extending through the member 57 and projecting at either side, the bolt having a clamp nut to enable the forked portions of the member 61 to be clamped to the member 57. By this means when the member 61 is disposed in longitudinal alinement with the member 57, the notches 62 will engage over the bolt 63 and positively limit the movement of the member 61 in one direction, and yieldably limit the movement in the opposite direction as hereafter explained. A cutting blade 65 is connected to the lower end of the member 61 and forms the chopping member of the improved device. Rising from one of the side members, for instance the member 20, is a standard 66, the standard being coupled by a rod 67 to one of the apertures 59 of the member 57. By this arrangement the upper end of the member 57 is maintained in fixed relations to the frame during the movement of the crank 50. By this means the cutting blade 65 is caused to travel through an elliptical path and pass over the ground or slightly beneath the surface during its forward stroke and to move upwardly and laterally above the ground at the return stroke. By providing a plurality of apertures 59, the rod 67 may be adjusted nearer to or farther from the crank and thus increase or decrease the shorter axis of the elliptical path of the cutter. The bolt 63 together with its binding nut, will hold the member 61 with sufficient firmness to resist its displacement from the bolt under ordinary conditions, or when chopping the stalks of the plants, but in event of meeting with abnormal resistance, or an obstruction which would be liable to injure or break the cutter members, the member 61 will yield and release the notches 62 from the bolt 63 and thus prevent breakage of the parts. The member 57 is provided with a socket 68 and set screw 69 to receive and support an L-shaped standard 70 having raker teeth 71 at its free end. By this means the plants which are severed by the chopper blade 65 may be thrown to one side, or the ground adjacent to the severed plants, "cultivated" or similarly treated at the same time that the cutting action is produced.

Mounted upon the frame member 10, is a notched segment 72 over which a lever 73 operates and is provided with a spring pawl 74 engaging with the notches of the segment. The lever 73 is provided with a lateral arm 75, while the frame members 20—21 are connected by a bail 76 from which a rod 77 leads to the arm 75. By this simple means it will be obvious that the oblong frame may be adjusted vertically or caused to swing upon its pivots 26—27 and thus correspondingly adjust the shaft 46 and its attachments vertically, or elevate the frame and its attachments bodily from the ground when not required.

With the device thus constructed, it will be obvious that the surplus plants may be readily "chopped" out at certain predetermined intervals as the cultivators move forward, while at the same time the ground between the rows of plants may be cultivated simultaneously with the chopping operations.

The improved apparatus is simple in construction, can be inexpensively manufactured, and applied without material structural changes to cultivator frames of various forms.

Having thus described the invention, what is claimed as new is:

1. In a device of the class described, the combination with a reciprocating bar carrying a chopping hoe, of a cultivator rake carried by said bar.

2. In a device of the class described, the combination with a reciprocating bar carrying a chopping hoe, of a cultivator rake including a shank, and means for adjustably connecting said shank to said bar.

3. In a device of the class described, the combination with a reciprocating bar carrying a chopping hoe and having a transverse aperture, of a cultivator rake including a shank received in the aperture of said bar, and clamping means operating to hold said shank adjustably in the bar.

4. In a device of the class described, the combination with a reciprocating bar, of a chopping hoe detachably connected to said bar, and a cultivator rake adjustably coupled to said bar.

5. In a device of the class described, the combination with a reciprocating bar, of a chopping hoe including a shank having a forked terminal bearing over said bar, means for securing said forked terminal detachably to said bar, and a cultivator rake adjustably coupled to said bar.

In testimony whereof I affix my signature in presence of two witnesses.

MARTIN A. JONES. [L. S.]

Witnesses:
 WILL PENNINGTON,
 B. L. OLIVER.

---

Copies of this patent may be obtained for five cents each, by addressing the "Commissioner of Patents, Washington, D. C."